United States Patent [19]

Tesch

[11] Patent Number: 5,415,917
[45] Date of Patent: May 16, 1995

[54] PLANE FORMED BODY, ESPECIALLY FLOOR COVERING AND PROCESS FOR PRODUCING IT

[76] Inventor: Gunter Tesch, Ave. Jean-Marie Musy 15, CH-1700 Fribourg, Switzerland

[21] Appl. No.: 182,165

[22] PCT Filed: May 25, 1993

[86] PCT No.: PCT/EP93/01310

§ 371 Date: Jan. 25, 1994

§ 102(e) Date: Jan. 25, 1994

[87] PCT Pub. No.: WO93/24694

PCT Pub. Date: Dec. 9, 1993

[30] Foreign Application Priority Data

May 26, 1992 [DE] Germany .................. 42 17 441.4

[51] Int. Cl.$^6$ ................................. B32B 3/06
[52] U.S. Cl. .............................. 428/102; 156/93; 156/256; 156/265; 156/324; 428/233; 428/236; 428/246; 428/284; 428/286; 428/903.3
[58] Field of Search ............ 156/93, 209, 256, 265, 156/324; 428/68, 74, 102, 234, 300, 903.3, 246, 103, 233, 236, 284, 286

[56] References Cited

U.S. PATENT DOCUMENTS

| | | | |
|---|---|---|---|
| 3,952,126 | 4/1976 | Dycks | 428/235 |
| 3,952,126 | 4/1976 | Dycks . | |
| 4,416,936 | 11/1983 | Erickson et al. | 428/300 |
| 4,495,235 | 1/1985 | Tesch | 428/300 |
| 4,622,260 | 11/1986 | Tesch | 428/300 |

FOREIGN PATENT DOCUMENTS 0089018  9/1983  European Pat. Off. .
1033923  6/1966  United Kingdom .

*Primary Examiner*—James J. Bell
*Attorney, Agent, or Firm*—Weingarten, Schurgin, Gagnebin & Hayes

[57] ABSTRACT

A plane formed body, especially a floor covering, is described with a cover layer (1), a base layer (3) and a core layer (2) that have fibers that can be stitched. The three layers are stitched by means of fibers (1a) taken from the cover layer (1). The core layer (2) consists of polyvinyl chloride material in the form of pieces that are in solid form and a PVC binder or plastisol paste. The fibers (1a) are tightly bonded into all three layers (1,2,3).

19 Claims, 1 Drawing Sheet

PLANE FORMED BODY, ESPECIALLY FLOOR COVERING AND PROCESS FOR PRODUCING IT

FIELD OF THE INVENTION

The invention concerns a plane formed body, especially a floor covering, and a process for producing it.

Plane formed bodies are known, for example from EP-A-00890818. They are produced in a process in which a core layer of particles is put between a layer of backing and a cover layer. The cover layer of the plane formed body has an active layer containing fibers that can be punched, and these fibers are needle-punched in through the core layer between the particles, which cannot be punched, into the layer of backing. The core layer is made cohesive with the cover layer and the backing layer first by needle-punching through the three layers. Then, by bonding and vulcanizing the core layer, such a plane formed body obtains an addition binding effect from inside. In the plane formed body described, the core layer consists of unfoamed elastic material, like, for example, granulates of vulcanized rubber, elastomers with or without unfoamed binders, granulates obtained from stitched felt floor coverings and the like. Such plane formed bodies can also be used as flooring coverings.

BACKGROUND OF THE INVENTION

The most common flooring-type coverings consist of a polymerized plastic, mostly of polyvinyl chloride. Because they are very common, the problem of reprocessing or recycling these synthetics is very important. In the past, old used PVC floor coverings were either thrown out or crushed, pulverized and used as additives in producing new materials. The use of such crushed materials is limited, however, since there are losses of quality. Thus, large residual quantities of old PVC coverings must be disposed of.

Another method of recycling reusable PVC is described in DE AS 24 34 925. This concerns a relatively expensive chemical processing of old PVC material.

DE AS 1 179 906 describes a process in which PVC waste material is first pulverized and then pressed onto a fiber backing. The materials have to have a certain composition to result in a usable floor covering.

SUMMARY OF THE INVENTION

The present invention provides a plane formed body, especially a floor covering so that permits especially lumpy polyvinyl chloride to be reused economically and without great expense.

If lumpy polyvinyl chloride material in solid form is used as a core layer between a cover layer and a base layer in a plane formed body, wherein the layers are needle-punched, the result is a way of using PVC plastic waste economically. And cut up PVC sheathing cable can be used (even with Cu or Al cores). The PVC waste material need only be prepared mechanically for further processing, i.e., only appropriate pieces of the plastic material need be produced. This preparatory cycle is simple and, as a rule, can be carried out with no other steps. The plane formed body of the invention also has high quality and good usage properties. Since a fiber layer is worked into solid, soft PVC plastic, the formed body has especially good soundproofing properties and especially high durability. By using old PVC coverings processed into pieces, the use of the old material in the production of new coverings can be increased from roughly 10–20% admixture to 80–100%. By using lumpy material, it is possible to produce a floor covering which has up to 70–90% old PVC material in its top layer and consists of up to 10–15% binding fibers and, if necessary an additive of especially new PVC binders, to fill in intermediate spaces and for additional bonding. The use of larger chip-like pieces that are, for example, 15 mm long, roughly 5 mm wide and between 0.5 and 2 mm thick is especially advantageous. The needles go through these pieces during the sewing process, so that the pieces are fixed simultaneously in their position in the core layer and thus cannot shift. It also eliminates the need for expensive processing of plastic waste into small, quasi-granular pieces. Larger pieces can also be used, and the new plane formed body in the invention has good usage properties, despite this. In addition, pieces this size have the advantage of making it easier to reuse decomposed softeners when using PVC coverings, for example, due to the larger surface area of the pieces than with smaller pieces. Due to the solid fiber bond in all three layers, especially in the core layer, the formed body in the invention also has sufficient strength for other molding processes. The pieces forming the core layer can consist of various materials, especially different-colored materials. This is an advantage especially when a color pattern is planned for the usage properties of the finished plane formed body. If the fibers in the cover layer of the stitched plane formed body consist of the same material as the core layer, raw material uniformity is guaranteed, which is important in disposal.

The invention provides for the layer of backing to consist of a woven or nonwoven material, especially polypropylene, polyethylene or jute.

Basically, a PVC binder or plastisol paste must be added to the core layer. The plastisol paste can be added directly to the core layer before the stitching process. This is a so-called wet stitching, since the needles take the fibers out of the cover layer through the still soft pasty plastisol paste. This type of process is chosen if the old material is to be especially well softened and dissolved and a good bond and product density are to be achieved. For a fiber-type, carpet-type surface, this also gives a more secure hold.

The plastisol paste can also be added only to the cover layer. Through the stitching process and the flow process, it gets into the core layer. The plastisol paste can also be added to the plane formed body when it has already been stitched. This type of process is chosen when stitching is done dry. The binder also fills any holes and pores that may be in the core layer, in addition to increasing the strength of the formed body. If the binder is added to the cover layer after stitching, needle holes or other flaws on the surface are smoothed out, for example. In addition, the plastisol paste can even out the base color, even if the formed body is one color. With rougher, more loosely stitched structures, the plastisol paste itself can be filled with pieces of PVC. By adding plastisol paste, not only is the strength of the formed body increased and such cohesion is achieved that the formed body is especially insensitive to buckling and rolling, i.e., is especially elastic, but also by using plastisol paste, the necessary softeners are also added to the used plastics in the core layer.

Heat treatment of the stitched formed body with the binder is essential, since the plastisol compound gels under the influence of heat, and its binding effect comes about in this state. By using additional pressure, the places where there are cavities are also eliminated.

The process for producing the stitched plane formed body in the invention is carried out so that first PVC material, especially PVC waste material, is cut up into pieces, and the pieces are deposited on a layer of backing, preferably next to one another, wherein they form the core layer of the plane formed body to be produced. The core layer is covered with a top layer containing fibers. Next, the three layers are needle-punched together with the fibers from the top layer. The needling pre-consolidates the plane formed body to be produced. Next, the stitched plane formed body is heat-treated under pressure. A nap/cam structure can also be worked into the plane formed body. In the past it was only possible to provide rubber floor coverings with such structures; it is not possible to work such structures into conventional PVC floor coverings because of the flow of the material. In the floor covering in the invention, due to the fiber bonding, the material is reinforced so that giving it a nap/cam structure is quite possible. If the nap is put into the floor covering in such a way that there are hollow spaces "underneath," they can be filled with adhesive and such a covering can be immediately attached to the floor.

It is advantageous if the pieces are heated before and/or during the stitching process, for example, by means of heat radiators. Heating the core layer before or during the stitching process also prevents needle breakage, since the pieces to be stitched soften. In addition, the fibers in the top layer introduced into the warm material of the core layer adhere better therein.

If the end product must have high elasticity and strength, the PVC pieces to be used according to the invention can be exposed for a few hours to the influence of softeners or, if necessary, solvents. Advantageously, the effect of these means is increased by high temperature. Through the use of appropriate solvents, the swelling of the plastic is accelerated besides the effect of softeners. Due to the swelling, the structure of the material is changed so that penetration and absorption of softeners is simplified. Even softeners containing dyes can be used to give the material the right effect.

It is advantageous if the plastisol paste or PVC binder is added in such a quantity and viscosity that at least the grains of the compound contained in the core layer are encompassed and surrounded. In this way, as it gels, the compound is bonded by heat to the grains of the core layer into an inner bond. The result is a basically homogeneous layer with the fibers, the pieces and the compound.

A stitched plane formed body is advantageously fed through at least one pair of calender rollers. The calender cycle not only achieves uniformity of the thickness of the plane formed body, but also the remaining pores and cavities are closed and the binder fibers, in the case of hot calendering, are sheathed and enclosed by the hot PVC compound. Hot calendering by a pair of rollers yields a solid plane formed body. A surface structure can be stamped on the plane formed body during calendering by means of a fluted roller. By having the plane formed body fed to the calender already stitched and thus hardened, a higher thickness deformation can take place than with the usual, non-stitched plane formed bodies.

As floor coverings, the plane formed bodies in the invention can be smooth or carpet-like PVC flooring.

The surface or back of the covering can be made fully or partially adhesive again and easy to work with by heating. Patterns can therefore also be applied later. They can also be easily laminated, especially with chemically adapted films, surfaces, textiles and knitted structures. This way, the tearing strength, especially with roof strips, can later be increased. With floor coverings, fiber structures can be incorporated. Such floor coverings have excellent soundproofing properties and a very favorable hard/soft effect. The floor covering in the invention is practically waterproof and scuffproof despite the fibers. It is also capable of being cut or punched.

BRIEF DESCRIPTION OF THE DRAWINGS

The invention will be described in greater detail using the figures below, in which.

DETAILED DESCRIPTION

Figure 1:
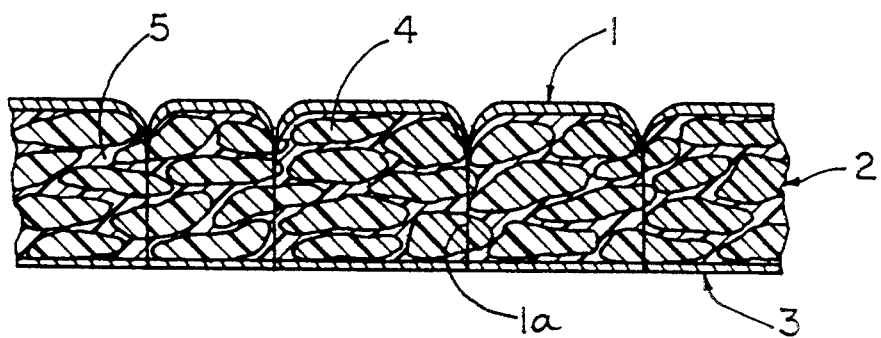
FIG. 1 is a schematic representation of a cross section through the stitched plane formed body and FIG. 2 is a schematic representation of a cross section through the stitched and calendered plane formed body.

FIG. 1 shows schematically a cross section through a stitched plane formed body. Fibers 1a of a cover layer 1 bond the cover layer 1 to a core layer 2 and a base layer 3. The pieces 4 of PVC material are already positioned, either by penetration or by a dense needle and fiber guide, so that they can no longer move freely and in the transverse direction. There is a plastisol paste 5 in the core layer 2.

Figure 2:
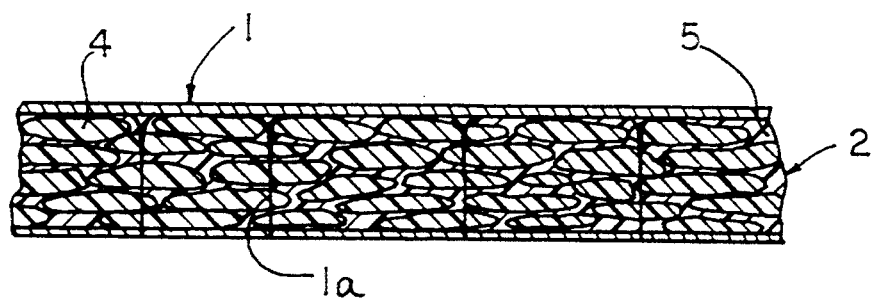

FIG. 2 shows a schematic representation of the plane formed body after the calender cycle. The thickness of the calendered formed body is less than the thickness of the plane formed body that is stitched alone. The surface of the calendered body is smooth, i.e., the needle holes and other gaps are filled here with the plastisol paste or with PVC binder. The plastisol paste 5 and the PVC binder 5 with pieces of PVC added to it are pressed in into the core layer 2 by the calender cycle, whereby an even better bond occurs between the individual pieces of PVC 4. Through the effect of temperature in the calender cycle, the plastisol paste 5 gels. Moreover, the fibers 1a in the cover layer 1, which are drawn into the core layer 2, are wedged in the core layer by the effect of pressure in the calender cycle, so that an additional bonding of the three layers 1, 2, 3 with one another is brought about. The use of additional binders like Latex is no longer necessary.

What is claimed is:

1. A plane formed body, especially a floor covering, with a cover layer having fibers that can be stitched, a base layer and a core layer, wherein the three layers are stitched by means of fibers taken from the cover layer, characterized by the fact that the core layer (2) consists of polyvinyl chloride (PVC) material in the shape of pieces that have a solid form, a binder selected from a group consisting of a PVC binder and a plastisol paste, and fibers (1a) tightly bonded into all three layers (1,2,3).

2. A plane formed body according to claim 1, characterized by the fact that pieces of the core layer (4) are produced from a used PVC flooring.

3. A plane formed body according to claim 1, characterized by the fact that the PVC pieces (4) are a maximum of 5 mm in width and 15 mm in length and have a thickness of roughly 0.5 mm to 2 mm.

4. A plane formed body according to claim 1, characterized by the fact that the base layer (3) consists of a woven material.

5. A plane formed body according to claim 4, characterized by the fact that the woven material is selected from a group consisting of polypropylene, polyethylene and jute.

6. A plane formed body according to, claim 1, characterized by the fact that the binder is basically only in the core layer (2).

7. A plane formed body according to claim 1, characterized by the fact that at least the fibers (1a) in the cover layer (1) are enclosed by a plastisol paste (5).

8. A plane formed body according claim 4, characterized by the fact that the binder or contains PVC scrap.

9. A process for producing a plane formed body including the steps of:
dividing PVC material into pieces,
depositing the pieces on a base layer (3), thereby forming a core layer (2),
depositing a cover layer (1) containing fibers (1a) on the core layer (2),
adding a binder to one of the core layer (2) and the cover layer (1),
stitching the base layer, the core layer, and the cover layer together with fibers from the cover layer to form a plane body,
heat treating under pressure the plane body.

10. A process according to claim 9, characterized by the fact that the pieces (4) are heated before stitching.

11. A process according to claim 9, characterized by the fact that the PVC pieces (4) are exposed to the influence of softeners before being deposited on the base layer (3).

12. A process according to claim 9, characterized by the fact that at the latest after stitching, a binder is applied to the cover layer (1).

13. A process according to claim 9, characterized by the fact that after the binder (5) is applied, the plane formed body is fed through at least one pair of rollers and the binder (5) is pressed at least into the cover layer (1).

14. A process according to claim 13, characterized by the fact that a surface (1) on the cover layer side is smoothed out during rolling.

15. A plane formed body according to claim 1, wherein the base layer consists of a nonwoven material.

16. A plane formed body according to claim 15, wherein the nonwoven material is selected from a group consisting of polypropylene, polyethylene, and jute.

17. A process according to claim 9, wherein the pieces are heated during stitching.

18. A process according to claim 9, wherein the PVC pieces are exposed to solvents before being deposited on the base layer.

19. A process according to claims 13, wherein a surface on the cover layer is stamped during rolling.

* * * * *